C. A. PSILANDER.
SELF ADJUSTING GUARD RAIL CLAMP.
APPLICATION FILED APR. 7, 1920.
1,414,708.
Patented May 2, 1922.
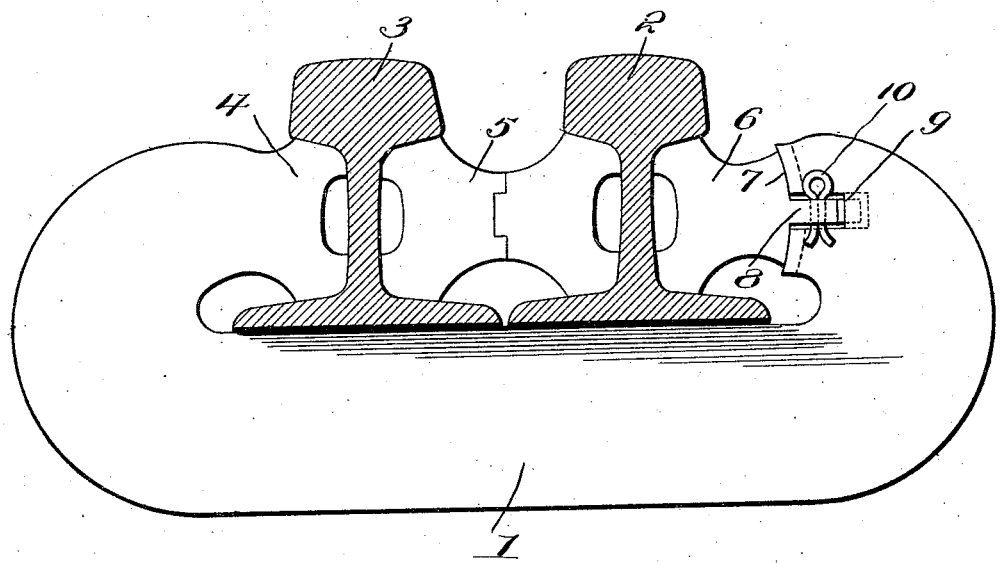
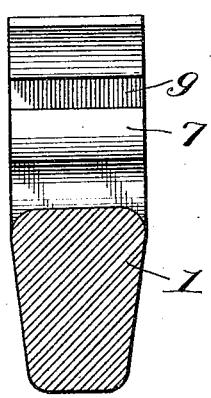
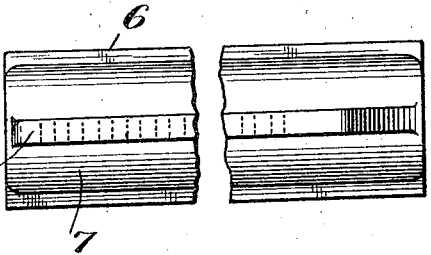
Inventor
Charles A. Psilander
By
Attorney

UNITED STATES PATENT OFFICE.

CHARLES A. PSILANDER, OF EASTON, PENNSYLVANIA, ASSIGNOR TO WILLIAM WHARTON, JR. & COMPANY, INCORPORATED, OF EASTON, PENNSYLVANIA, A CORPORATION OF PENNSYLVANIA.

SELF-ADJUSTING GUARD-RAIL CLAMP.

1,414,708.                Specification of Letters Patent.        Patented May 2, 1922.

Application filed April 7, 1920. Serial No. 371,819.

*To all whom it may concern:*

Be it known that I, CHARLES A. PSILANDER, a citizen of the United States, residing at Easton, in the county of Northampton and State of Pennsylvania, have invented certain new and useful Improvements in Self-Adjusting Guard-Rail Clamps, of which the following is a specification.

The effectiveness of a guard-rail clamp is largely dependent upon its bearing connections with the rails. If the clamp and its accessories have manufacturing faults which preclude a proper surface contact it frequently happens that under vertical displacement of the rails, as is possible through a worn blind driver or worn running rail, the resultant movement of the clamp tends to spread the latter due to an angular displacement of the spacing blocks, or of the wedge, or of both. This condition manifestly prevents proper co-operation of the clamp and rails and not only imposes an undesirable strain on the clamp, but materially interferes with its clamping action.

The object of the present invention is to provide means for compensating for manufacturing faults in the clamp and its accessories and for minimizing spreading of the clamp by allowing the latter to adjust itself automatically to changing conditions of stress and thereby compensate for the relative movement without materially interfering with the clamping action.

One embodiment of the invention is illustrated in the accompanying drawings, in which Figure 1 is a view in elevation, partly in section, showing the application of the improved clamp.

Fig. 2 is a face view of the wedge block between the clamp end and running rail, showing particularly the cylindrical bearing.

Fig. 3 is a face view of the end of the clamp, showing its cylindrical bearing.

The improved guard-rail clamp, is, aside from the particulars of its relative bearing with the rail, of any usual or preferred type, being here shown as a member 1, adapted to underlie the running rail 2 and guard-rail 3. One terminal 4 of the clamp is adapted to engage the web of the guard-rail and interfit with the head and flange of such rail. The usual spacing blocks 5 are arranged between the running rail and guard-rail, such blocks being preferably of the usual wedge block type shaped to interfit and maintain a square bearing with the rails.

Under this arrangement, the co-operation of the running rail and guard-rail with the clamp has been along straight bearing lines, and such are also maintained between the spacer blocks and the rails. Under any strain tending to a vertical displacement of the rails, this straight-line bearing junction between the clamp and rails, and between the spacer blocks and rails is interrupted, and a displacement of the upper and lower portions of such parts relative to the rails results. This tilting at once interferes with the proper bearing or clamping action and the effectiveness of the clamp is largely nullified. Moreover, this position of the parts tends to an unusual and severe strain on the clamp, with a liability to breakage.

The present invention overcomes this difficulty or deficiency by so forming what may be termed the bearing end of the clamp that it is capable of self-adjustment under the conditions described, and by such self-adjustment compensate for conditions largely due to manufacturing faults. Accordingly, I make the co-acting faces 7 of the clamp and of the wedge-block 6 cylindrical on a radius determined by the possible movement of the clamp under the displacement to be guarded against. With such provision, under the tilting of angular positions resultant from such displacement or strain, the clamp will shift on such cylindrical bearing and the parts will assume their normal or straight-bearing position.

The cylindrical bearing thus renders the clamp and the moving parts held thereby self-compensating and self-adjusting relative to the rails. The cylindrical bearing is here shown between the clamp and running rail, but obviously it may be applied between the clamp and guard-rail.

The wedge-block 6 is provided with the usual tongue 8 accommodated in a somewhat enlarged recess 9 in the clamp end, the usual holding means 10 engaging such tongue to hold the wedge-block 6 in adjusted position relative to the clamp.

The term accessories as employed in the claims refers to the filler or spacing blocks and the wedge block.

Having described my invention, I claim:—

1. The combination of a running rail, a guard rail, a yoke clamp and its accessories, and means for compensating for manufacturing faults in the clamp and its accessories and responsive to changing directions of stress to restore the straight line bearing relation of the parts.

2. The combination of a running rail, a guard rail, a yoke clamp and its accessories, and means, responsive to abnormal directions of stress in the assembly for minimizing spreading of the clamp and enabling the latter to automatically adjust itself in order to maintain the straight line bearing relation of the parts.

3. The combination of a running rail, a guard rail, a yoke clamp and its accessories, and means co-operating with the clamp and responsive to abnormal stress to permit the clamp to automatically adjust itself, said means compensating for the relative movement of the parts without materially interfering with the clamping action.

4. The combination of a running rail, a guard rail, a yoke clamp and its accessories, and means for maintaining the straight line bearing positions of the parts, said means including a self-centering wedge at one end of the clamp.

5. The combination of a running rail, a guard rail, a yoke clamp and its accessories, and means for maintaining the straight line bearing relation of the parts, said means including a self-centering wedge afforded a cylindrical bearing in one of the wings of the clamp.

6. The combination of a running rail, a guard rail, a filling, and means for clamping said elements and capable of automatic bodily movement under stress tending to angular displacement of the parts to thereby relieve itself of such stress and to restore the normal bearing relation of the parts.

7. The combination of a running rail, a guard rail, a filling, and self-adjusting clamping means capable of bodily movement in response to tilting of the rails to preserve the straight line bearing positions of the parts.

8. The combination of a running rail, a guard rail, spacing blocks, and a yoke clamp, and a self-centering wedge afforded a bearing within the confines of the clamp, the co-acting faces of the wedge and clamp being curved to admit of compensating movement of the clamp in response to abnormal direction of stress.

9. A self-adjusting clamp for spaced rails, embodying a yoke having a self-centering wedge block afforded a bearing in one of the wings thereof, the co-acting faces of the block and clamp being curved whereby they are capable of relative compensating movement.

In testimony whereof I affix my signature.

CHARLES A. PSILANDER.